(No Model.)

T. F. RANKIN.
ICE CREAM MOLD AND DISHER.

No. 591,635.  Patented Oct. 12, 1897.

Witnesses:
W. A. Blakley
Jos. P. Ule

Inventor:
Thomas F. Rankin,
By J. N. Cooke,
Attorney

UNITED STATES PATENT OFFICE.

THOMAS F. RANKIN, OF ALLEGHENY, PENNSYLVANIA, ASSIGNOR OF ONE-HALF TO JOSEPH A. BUTTRESS, OF SAME PLACE.

ICE-CREAM MOLD AND DISHER.

SPECIFICATION forming part of Letters Patent No. 591,635, dated October 12, 1897.

Application filed November 6, 1896. Serial No. 611,244. (No model.)

*To all whom it may concern:*

Be it known that I, THOMAS F. RANKIN, a resident of Allegheny city, in the county of Allegheny and State of Pennsylvania, have invented a new and useful Improvement in Ice-Cream Molds and Dishers; and I do hereby declare the following to be a full, clear, and exact description thereof.

My invention relates to ice-cream molds and dishers, and has special reference to such devices as can be operated with one hand.

The object of my invention is to provide an ice-cream mold and disher which can be operated by one hand of the operator and be exceedingly light in its weight on account of the material composing the same, and one which will be extremely simple in its construction, strong, durable, and effectual in its operation.

Still further objects of my invention are to provide such a device that after the ice-cream has been expelled the parts will return to their normal position, and one which will be comparatively inexpensive to manufacture, will have no delicate parts to get out of order, and will not become clogged during its operation.

My invention consists, generally stated, in the novel construction, combination, and arrangement of parts, as hereinafter more specifically set forth and described, and particularly pointed out in the claims.

To enable others skilled in the art to make and use my invention, I will describe the same more fully, referring to the accompanying drawings, forming a part of this specification, in which—

Figure 1:
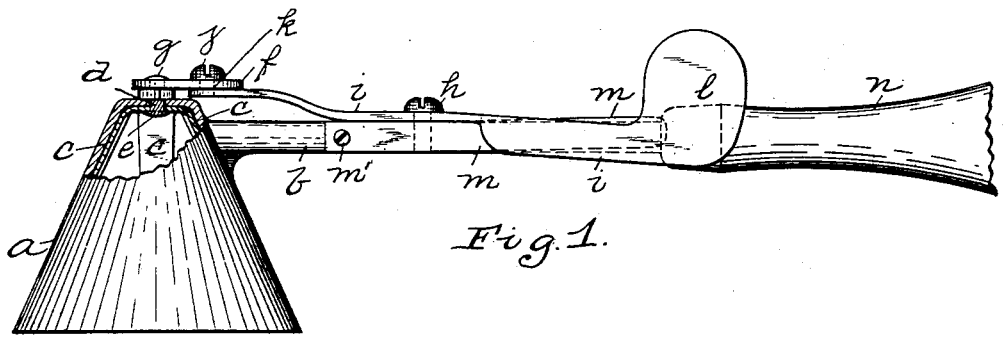
Figure 2:
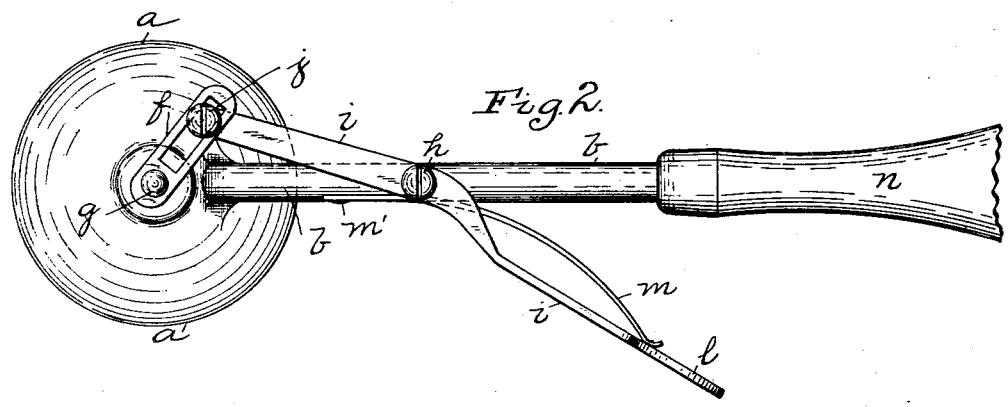
Figure 3:
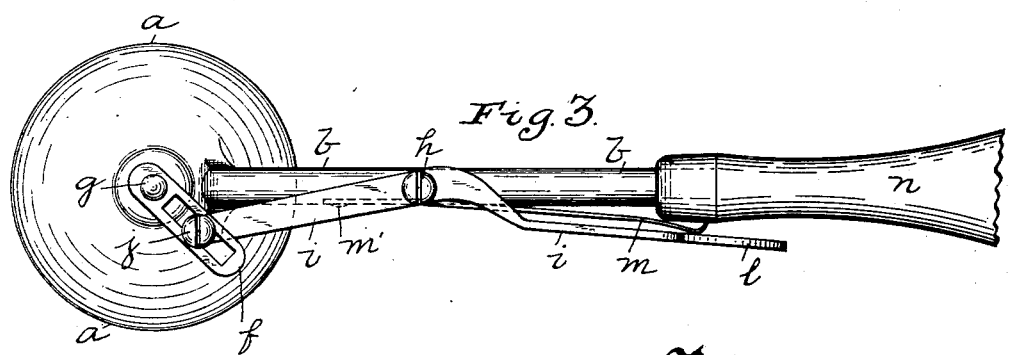

Figure 1 is a side view, partly in section, showing my invention applied to an ice-cream mold and disher. Fig. 2 is a top or plan view of the same, showing the parts in their normal position; and Fig. 3 is a like view showing the parts in position after the ice-cream has been expelled from the mold.

Like letters herein indicate like parts in each of the figures of the drawings.

As illustrated in the drawings, $a$ represents the mold, to which is secured the handle $b$, which is formed as part of the mold $a$, these parts being preferably made from aluminium. The mold $a$ is preferably formed cone-shaped and is provided with the cutters $c$, journaled in the apex of the cone of the mold $a$. A collar $d$ is provided in the top of the mold $a$, forming a journal for the rivet or head $e$, carrying the cutters $c$, and above the collar $d$ is secured a link $f$, which is preferably formed of aluminium and held against the collar $d$ by means of the rivet $g$. Pivoted on the top face of the handle $b$ by means of the pivot $h$ is the operating-lever $i$, which is preferably formed of aluminium and connects at one end with the link $f$ by means of the head $j$, forming a pivot $k$ within the link $f$. The other end of the lever $i$ extends down on the side of the handle $b$ from the pivot $h$ and has a thumb-piece $l$ formed thereon for convenience in operating the same. Secured on one side of the handle $b$ by bolts $m'$ passing through one end thereof is the spring $m$, which is preferably formed of flat spring-steel, the opposite end of the spring $m$ being adapted to bear against the lever $i$ at or near the thumb-piece $l$ thereof. A wooden section $n$ is placed around the free end of the handle $b$ for convenience in grasping the same.

The operation of my improved ice-cream mold and disher is as follows: The mold is inserted into the freezer containing the ice-cream or other substance on which it is being used and, when filled by dipping, the mold is inverted over the saucer, plate, or glass and the thumb placed upon the thumb-piece $l$ on the lever $i$ and forcing the same inwardly will cause the lever $i$ to turn upon its pivot $h$ and through the medium of the head $j$ and pivot $k$ within the link $f$ will act to throw the link $f$ to the opposite side of the handle $b$, or about a quarter of a revolution, so rotating the cutters $c$ within the mold $a$ the same distance and causing the substance within the mold $a$ to loosen and drop out upon the saucer, plate, or other receptacle. After this operation is completed and the operator releases his thumb from the thumb-piece $l$ the lever $i$ will return or spring out to its normal position, as shown in Fig. 2, through the releasing of the pressure upon the spring $m$, so returning the cutters $c$ to their normal position and putting the parts in position for another operation.

It will thus be seen that my improved ice-cream mold and disher is always in position for instant use, and the thumb-piece on the lever being located down on one side of the handle renders the operation easy and convenient and prevents the twisting of the thumb and hand, as in some cases where the thumb-piece is located on top of the handle.

Various modifications in the construction and position of the various parts may be resorted to without departing from the spirit of the invention or sacrificing any of its advantages.

What I claim as my invention, and desire to secure by Letters Patent, is—

1. The combination with a mold having a handle thereon and cutters journaled in the top of the mold, of a link extending from the head of the cutters, and an operating-lever adapted to move laterally having its end journaled in said link to revolve the cutters, said operating-lever being pivoted on top of the handle and having its free end extending down to one side of the handle, substantially as and for the purposes set forth.

2. The combination with a mold having a handle thereon and cutters journaled in the top of the mold, of a link extending from the head of the cutters, an operating-lever adapted to move laterally having its end journaled in said link to revolve the cutters, said operating-lever being pivoted on top of the handle and having its free end extending down to one side of the handle, and a thumb-piece secured on the free end of said lever, substantially as and for the purposes set forth.

3. The combination with a mold having a handle thereon and cutters journaled in the top of the mold, of a link extending from the head of the cutters, an operating-lever adapted to move laterally having its free end journaled in said link to revolve the cutters, said operating-lever being pivoted on top of the handle and having its free end extending down to one side of the handle, a thumb-piece secured on the free end of said lever, and a spring engaging with said lever and handle, substantially as and for the purposes set forth.

4. The combination of a mold $a$ having a handle $b$ thereon and cutters $c$ journaled in the top of the mold $a$, a link $f$ extending from the head $e$ of the cutters $c$, an operating-lever $i$ adapted to move laterally having its free end pivoted at $k$ within said link $f$ to revolve the cutters $c$, said operating-lever $i$ being pivoted at $h$ on top of the handle $b$ and having its free end extending down to one side of the handle $b$, a thumb-piece $l$ secured on the free end of said lever $i$, and a spring $m$ engaging with said lever $i$ and handle $b$, substantially as described.

In testimony whereof I, the said THOMAS F. RANKIN, have hereunto set my hand.

THOMAS F. RANKIN.

Witnesses:
 J. N. COOKE,
 JOS. P. VEK.